United States Patent [19]

Valere

[11] 4,077,635
[45] Mar. 7, 1978

[54] DEVICE FOR SELECTIVELY POSITIONING THE ARM OF A RECORD PLAYER

[76] Inventor: Eugene Valere, 1266 Rogers Ave., Apt. #1, Brooklyn, N.Y. 11226

[21] Appl. No.: 726,665

[22] Filed: Sep. 27, 1976

[51] Int. Cl.² .............................................. G11B 3/10
[52] U.S. Cl. ................................ 274/23 R; 274/1 R; 274/9 RA
[58] Field of Search .................. 274/1 R, 23 R, 13 R, 274/14, 15 R, 9 RA

[56] References Cited

U.S. PATENT DOCUMENTS

| | | | |
|---|---|---|---|
| 2,352,778 | 7/1944 | Eddy | 274/1 R |
| 2,602,668 | 7/1952 | Finneran et al. | 274/1 R |
| 3,172,669 | 3/1965 | Staar | 274/13 R |

Primary Examiner—Richard E. Aegerter
Assistant Examiner—John W. Shepperd
Attorney, Agent, or Firm—Robert D. Farkas

[57] ABSTRACT

An improvement in a record player of the type having a base, turntable and a pivotally mounted, positionable tone arm comprising a device for selectively positioning the tone arm along the radius of a record to a repeatable position. The device comprises a first member extending from the tone arm and a pivotally mounted and selectively positionable and lockable stop member for preventing movement of the tone arm when the tone arm is lifted and moved toward the center of the record by having the first member contact the stop member. Placement of the tone arm down to the record plane permits the first member to pass over the stop member.

6 Claims, 6 Drawing Figures

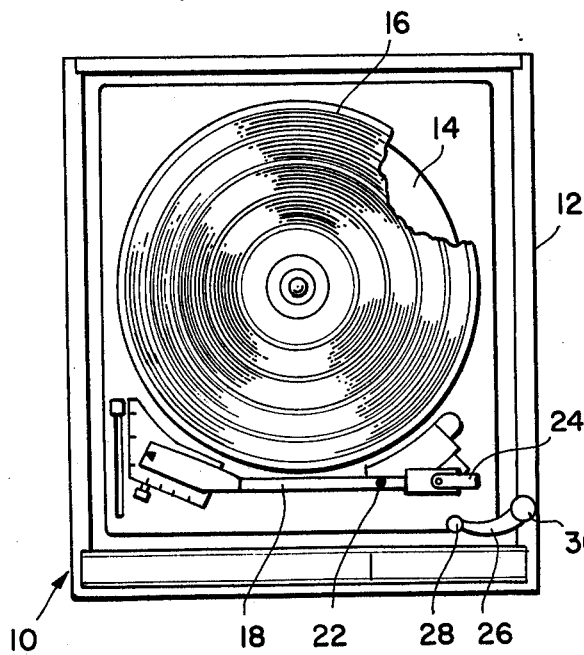
FIG.1
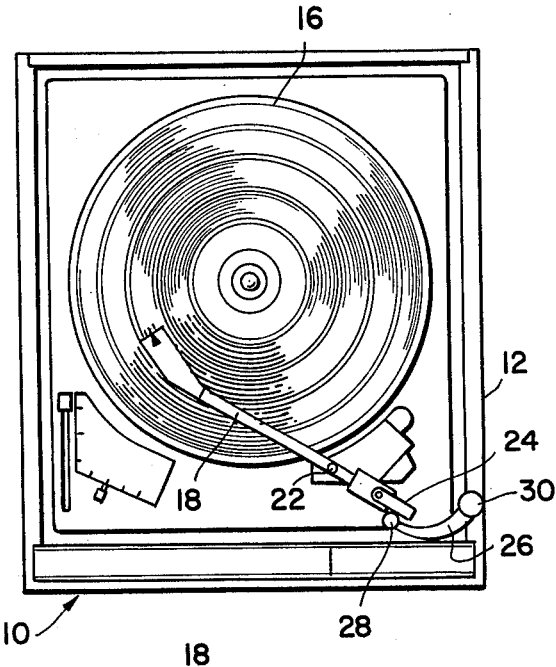
FIG.2
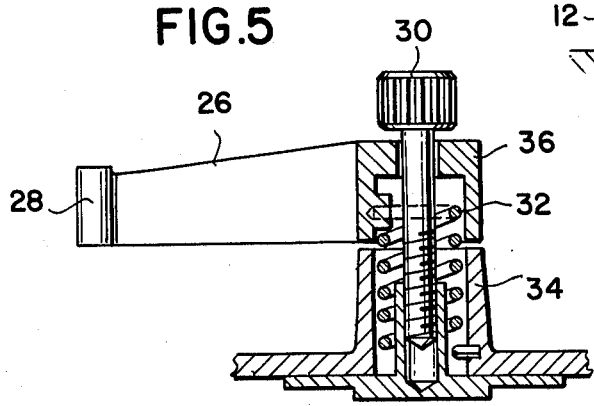
FIG.4
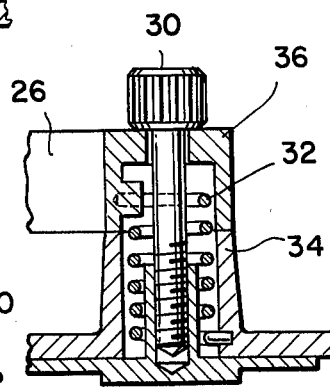
FIG.5
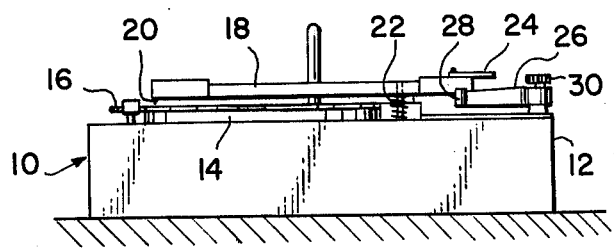
FIG.3
FIG.6

DEVICE FOR SELECTIVELY POSITIONING THE ARM OF A RECORD PLAYER

BACKGROUND OF THE INVENTION

The present invention relates to record players in general and more specifically to a device for selectively positioning the tone arm of a record player in a desired position along the radius of a record to be played.

Many devices are known in the prior art relating to the pivot mechanism for a record player tone arm and for cueing devices for the tone arm.

The pivot mechanisms, such as those shown in U.S. Pat. Nos. 3,380,744, 3,649,031, 3,722,893 and 3,730,536, provide sensitivity adjustments but do not provide a stopping action so that the tone arm can be accurately and repeatedly set in a desired position along the radius of a record.

The cueing mechanisms, such as those shown in U.S. Pat. Nos. 3,717,350, 3,727,922, 3,761,098 and 3,774,917, provide the ability to raise or elevate the tone arm from a record so that it can be moved therealong to a desired position. However, none of these prior art patents disclose means for selectively positioning the tone arm at the desired position by use of an adjustable stop so that the tone arm can be accurately and repeatedly set in that position.

SUMMARY OF THE INVENTION

It is the principa object of this invention to provide a cueing device for a record player by providing an easily setable stop member to effect repeatable placement of the tone arm at a specific radial location on the record.

This and other objects are achieved by the preferred embodiment of the present invention which comprises a first member or arm extending from an end of a pivotable tone arm opposite the end supporting the stylus and having tone arm pivot located therebetween. A stop member is pivotally and lockable is located on the base of the record player. The stop member coacts with the arm to selectively limit the movement of the stylus inwardly toward the center of the record when the stylus end of the tone arm is lifted and rotated inward. With the tone arm in the playing position, the arm can pass over the stop member for playing the record with no impedement.

Having in mind the above and other objects that will be obvious from an understanding of the disclosure, the present invention comprises a combination and arrangement of parts illustrated in the presently preferred embodiments of the invention, which are hereinafter set forth in sufficient detail to enable those persons skilled in the art to clearly understand the function, operation, construction and advantages of it when read in conjunction with the accompanying drawing.

BRIEF DESCRIPTION OF THE DRAWING

The invention will be described in detail, by way of example, with reference to the accompanying drawing in which:

FIG. 1 is a plan view of the preferred embodiment of the invention;

FIG. 2 is a plan view utilizing the principle of the present invention;

FIG. 3 is an elevation view of the invention coordinate to FIG. 2;

FIG. 4 is an elevational view of the invention coordinate to FIG. 1;

FIG. 5 is a crosssectional view of the stop member shown in the unlocked position; and FIG. 6 is a cross sectional view of the stop member shown in the locked position.

DETAILED DESCRIPTION OF THE INVENTION

Referring to FIGS. 1-4 of the drawing and in accordance with the principles of the invention, a record player 10 is shown having base 12, a turntable 14 supporting a record 16 and a tone arm 18 mounting a stylus 20. The tone arm 18 is mounted on a rotatable pivot 22 to permit movement of the tone arm 18 in a planes both parallel and perpendicular to the base 12. An improvement to the aforemention record player 10 comprises a first member 24 extending outwardly from and along the longitudinal axis of the tone arm 18 and a stop member 26 pivotally mounted to the base 12 for movement in a plane parallel thereto.

In use, the stop member 26 is configured to coact with the first member 24 when the tone arm 18 is raised to remove the stylus 20 off the record 16 and then rotated toward the center of the record 16 to a desired position along the radius thereof. At a predetermined location of the stylus 20 between the beginning and the end of the record 16, the first member 24 will strike a rubber bumper 28 on the stop member 26. The tone arm 18 is lowered to allow the stylus 20 to contact the record 16 for playing. In this lowered position as shown in FIGS. 1 and 4, the first member 24 can pass over the top of the stop member 24.

The stop member 26 being selectively adjustable and lockable, the tone arm 18 may be selectively positionable for repeated placement of th stylus 20 with respect to a radial distance on the record 16.

FIGS. 5 and 6 describe the construction of the stop member 16 which is arcuate in shape and pivots on thumb screw 30 which also acts to lock and release the member 26 at a desired stop position. A biasing torsion spring 32 having one end fixed to boss 34 extending from the base 12 and the other end anchored in hub 36 at the end of the stop member 26. The spring 32 urges the member 26 in a clockwise direction and aids in its setting.

While preferred and other exemplary embodiments of the invention are illustrated and/or described, it will be understood that the invention is in no way limited to these embodiments.

What is claimed is:

1. In a record player of the type having a base, a turntable and a positionable tone arm pivotally mounted at one end for movement in a plane parallel to the base and for movement in a plane perpendicular to the base, wherein the improvement comprises: a device for selectively positioning the tone arm in a desired position along the radius of a record to be played to permit the repeatable placement of the tone arm on the record on a portion between the beginning and the end thereof, said device comprising a first member connected to said one end of the tone arm and extending outwardly therefrom along the longitudinal axis of the tone arm, a boss fixedly secured to and extending upwardly from said base, an elongated stop member, said stop member having an end pivotally secured to said boss, and a side of said stop member adjacent the free end of said stop member configured to engage with the first member to stop movement of the tone arm only when the tone arm is both lifted and moved along the record towards the center thereof and means pivotally mounting an end of said stop member to said boss above said base for movement in a plane parallel to said base to enable the selective adjustment of the stop member to stop the tone arm at a desired position.

2. In a record player according to claim 1, wherein said stop member is arcuate in shape and has a rubber bumper at said free end thereof for contacting said first member.

3. In a record player according to claim 2, wherein said means pivotally mounting said stop member includes means for releasably locking said secured end of said stop member to said boss in a desired stop position.

4. In a record player according to claim 3, wherein said means for locking includes a manually setable thumbscrew.

5. In a record player according to claim 4, wherein said means for pivotally mounting the stop member includes means biasing the stop member for clockwise rotation, wherein said biasing means disposes said free end of said stop member such that said first member permits said tone arm to be selectively positioned along any desired position along said radius of said record when said releasable locking means are released.

6. In a record player according to claim 5, wherein the biasing means comprises a torsion spring, one end of said spring affixed to said boss, the other end of said spring affixed to said stop member.

* * * * *